(12) United States Patent
Gjelseth

(10) Patent No.: US 11,559,048 B2
(45) Date of Patent: Jan. 24, 2023

(54) MOVING FARMED AQUATIC ANIMALS

(71) Applicant: MMC First Process AS, Fosnavåg (NO)

(72) Inventor: Leif Roger Gjelseth, Bølandet (NO)

(73) Assignee: MMC First Process AS, Fosnavåg (NO)

( * ) Notice: Subject to any disclaimer, the term of this patent is extended or adjusted under 35 U.S.C. 154(b) by 0 days.

(21) Appl. No.: 17/136,878

(22) Filed: Dec. 29, 2020

(65) Prior Publication Data

US 2022/0201988 A1 Jun. 30, 2022

(51) Int. Cl.
*A01K 61/95* (2017.01)
*A01K 61/10* (2017.01)
*A01K 63/02* (2006.01)

(52) U.S. Cl.
CPC .............. *A01K 61/95* (2017.01); *A01K 61/10* (2017.01); *A01K 63/02* (2013.01)

(58) Field of Classification Search
CPC ........ A01K 63/02; A01K 61/95; A01K 61/10; A01K 61/90
USPC .......................................................... 119/201
See application file for complete search history.

(56) References Cited

U.S. PATENT DOCUMENTS 6,161,504 A * 12/2000 Jungling ................ A01K 79/00
119/226
2017/0238512 A1* 8/2017 Hilmarsson ............ A01K 61/10

FOREIGN PATENT DOCUMENTS

| NO | 305821 B1 * | 8/1999 | |
|---|---|---|---|
| NO | 305821 B1 | 8/1999 | |
| NO | 310391 | 7/2001 | |
| NO | 324024 B1 | 7/2007 | |
| NO | 341228 B1 * | 9/2017 | |
| NO | 20160581 A1 | 10/2017 | |
| WO | WO-03092369 A1 * | 11/2003 | ............. A01K 61/90 |
| WO | WO-2013108251 A2 * | 7/2013 | ........... A01K 61/001 |

OTHER PUBLICATIONS

NO 20201424 , "Norwegian Search Report", dated Apr. 21, 2021, 2 pages.
PCT/NO2021/050275 , "International Search Report", dated Mar. 7, 2022, 4 pages.
"Moving Fish by Gravity Between Tanks in Land-Based Food Fish Facility", Cflow, Optimum Fish Welfare, 8 pages.
NO20201424, "Search Report", dated Sep. 14, 2022, 2 pages.

* cited by examiner

*Primary Examiner* — Brady W Frazier
*Assistant Examiner* — Zoe Tam Tran
(74) *Attorney, Agent, or Firm* — Kilpatrick Townsend & Stockton LLP

(57) ABSTRACT

A method of moving farmed aquatic animals from a tank containing the animals, the tank having a tank outlet and a conveyance pipe, the conveyance pipe having a conveyance pipe inlet connected to the tank outlet and a conveyance pipe outlet at an outlet elevation higher than the tank outlet, the method comprising: (i) by means of a water inflow into the tank, maintaining a water level in the tank at a level above the outlet elevation to generate a flow of water from the tank through the conveyance pipe while positioning a moveable water-permeable screen inside the tank to crowd the animals towards the tank outlet, (ii) by means of the flow of water therethrough, moving animals through the conveyance pipe.

10 Claims, 1 Drawing Sheet

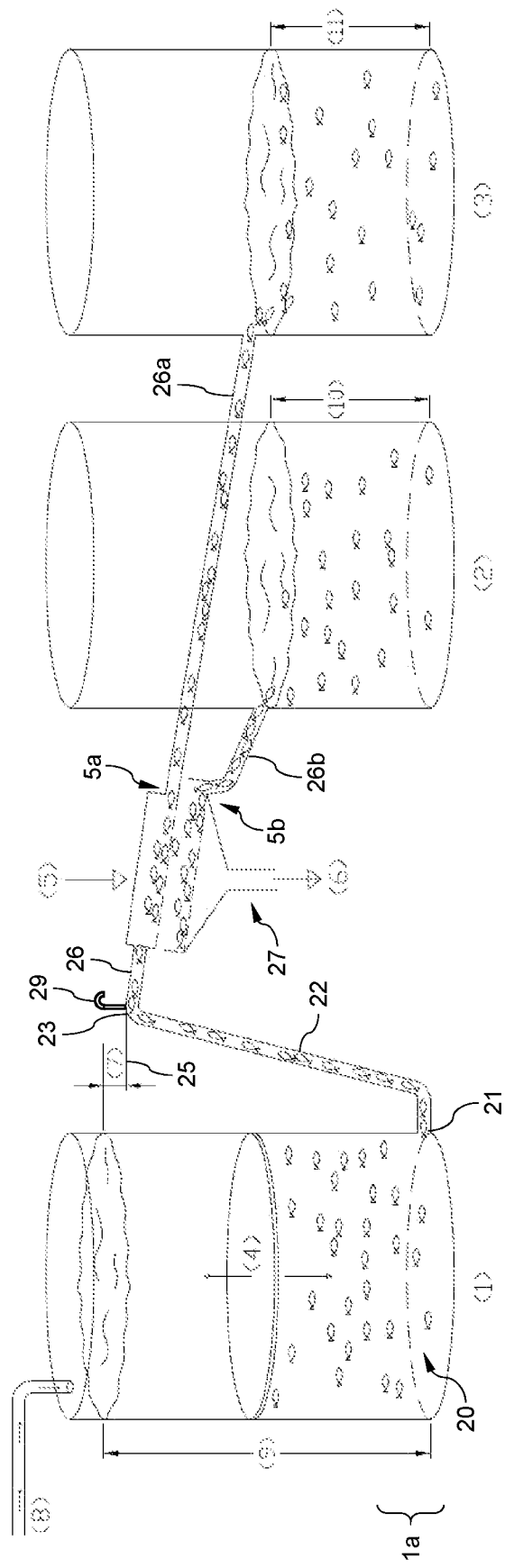

MOVING FARMED AQUATIC ANIMALS

The present invention relates to a method of moving aquatic animals in a production farm, such as the movement of fish in a fish farm.

BACKGROUND

Farming of aquatic animals, such as fish, is a growing industry worldwide and plays a key role for human food supply in many countries. Often, such farming is carried out in tanks, which may be positioned onshore, i.e. in land-based tanks. Land-based farming may be done for the entire production cycle of a particular species, or parts of it, for example for salmon during the first parts of the life cycle before the fish is moved to sea-based pens.

During such farming in tanks, the animals may have to be moved several times. This may be the case for example if a tank needs to be emptied (e.g. for cleaning), if a number of animals need to be split between several tanks, if measurements, counting, treatment or similar steps are needed, or for other reasons.

In such farming, efficient processes are of high importance in order to reduce cost and to reduce the time required, since for example pumping or movement may create increased stress levels for aquatic animals, which can be detrimental to production rates and generally should be avoided as much as possible in order to maintain good animal welfare.

There is consequently a need for improved solutions for handling of aquatic animals, hereunder moving such animals within a farm. The present invention has the objective to provide such improved solutions, or at least alternatives to known systems and techniques.

SUMMARY

According to an embodiment, a method of moving farmed aquatic animals from a tank containing the animals, the tank having a tank outlet and a conveyance pipe, the conveyance pipe having a conveyance pipe inlet connected to the tank outlet and a conveyance pipe outlet at an outlet elevation higher than the tank outlet, the method comprising: (i) by means of a water inflow into the tank, maintaining a water level in the tank at a level above the outlet elevation to generate a flow of water from the tank through the conveyance pipe while positioning a moveable water-permeable screen inside the tank to crowd the animals towards the tank outlet, and (ii) by means of the flow of water therethrough, moving animals through the conveyance pipe.

BRIEF DESCRIPTION OF THE DRAWINGS

These and other characteristics will become clear from the following description of illustrative embodiments, given as non-restrictive examples, with reference to the attached drawings, in which FIG. 1 is a schematic illustration of a method according to an embodiment.

DETAILED DESCRIPTION

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

FIG. 1 illustrates a method according to an embodiment. The method comprises moving farmed aquatic animals 20 from a tank 1 containing the animals 20. The tank 1 has a tank outlet 21 and a conveyance pipe 22, where the conveyance pipe 22 is at its inlet connected to the tank outlet 21 and has an outlet 23 at an elevation 25 higher than the tank outlet 21. By "elevation" is here meant vertical elevation, or height.

The outlet 21 may be arranged at a lower part 1a of the tank 1, for example at a lower one-third, one-fourth, one-fifth, or one-tenth (10%) of the tank 1, when considered in relation to the overall height of the tank 1.

As an example, the animals may be fish. When having such fish in the tank 1, there may after some time be a need to move the animals. For example, the fish may need to be split into more than one tank due to their growth or for other reasons. It is desirable to be able to move the fish (or other animals) from the tank 1 without causing stress for the fish and with minimised risk of harming fish. Such stress or harm/damage may, for example, occur if using a pump through which the fish is pumped, whereby the fish may be exposed to large pressure gradients, flow rates or mechanical components.

According to an embodiment, the method may comprise providing a water inflow 8 into the tank 1, whereby a water level 9 is maintained in the tank 1 at a level which is above (i.e. higher than) the outlet elevation 25. The provision of a water inflow 8 is used to generate a flow of water from the tank 1 through the conveyance pipe 22 and to the outlet 23. While providing the water inflow 8 as described, a moveable water-permeable screen 4 is positioned inside the tank 1 such as to crowd the fish towards the tank outlet 21. The water-permeable screen 4 may, for example, be moved towards the tank outlet 21, in this case downwardly, in a plurality of steps or continuously. The movement may be adjusted based on the density of fish below the screen 4 and to keep the density acceptably low in order to maintain fish welfare and avoid stress or over-crowding.

The screen 4 may, for example, be a frame structure or a grid having a net fixed thereon. An example of a screen which may be suitable for this purpose is given in Norwegian patent 324024.

By means of the flow of water through the conveyance pipe 22 due to the height difference 7 maintained between the outlet 23 and the water level 9, fish can be moved with the water stream through the conveyance pipe 22. The movement of fish may thus be carried out without having to use a pump or other equipment in the passage through which the fish is transported, and the fish can be transported in a gentle manner. A pump for the water supply 8 can be positioned elsewhere, or a natural supply of water can be used, if available.

The conveyance pipe outlet 23 may be connected to a transport pipe 26. The transport pipe 26 may for this purpose be integrally connected with the conveyance pipe 22, or the conveyance pipe 22 and the transport pipe 26 can be formed by a single pipe, in which case the conveyance pipe outlet 23 can be considered as the highest-laying section of the pipe (i.e. the part at elevation 25). At this point a transition between the conveyance pipe 22 and the transport pipe 26 is made. An air vent 29 may be arranged at the conveyance pipe outlet 23 or in the transport pipe 26.

The transport pipe 26 can be configured for transporting fish to other tanks, to processing units, or otherwise to another location, as applicable.

The fish may, for example, be transported to a second tank 2 via the transport pipe 26. During this process, a water level 10 in the second tank 2 is advantageously maintained at a level lower than the outlet elevation 25 of the conveyance pipe 22. In this manner, it is not necessary to pump the fish-and-water stream in the conveyance pipe 22 to an elevation higher than the water level 9 in the first tank 1. This reduces or eliminates pumping work and impact on the fish.

In some embodiments, the method may comprise moving at least a proportion of the fish to a third tank 3. The fish in the first tank 1 may, for example, be split between the second and third tanks 2,3. Similarly, this may advantageously be done while maintaining a water level 11 in the third tank 3 at a level lower than the outlet elevation 25.

The transport pipe 26 may comprise different sections 26a,26b for transport to the respective second and third tanks 2,3.

In one embodiment, the fish may be moved via a processing unit 5. This may be a processing unit for counting fish, for treating fish (e.g. medication or immunisation), for measuring fish, or other activities. The processing unit 5 may include automatic operations (such as automatic counting by means of camera vision or the like), and/or manual operations such as human operators performing activities in relation to the fish.

The processing unit 5 may, for example, comprise a size-sorting unit. Such a size-sorting unit may comprise first and a second outlets 5a,b for fish of different size. Access to one of the first and second outlets 5a,5b may be via an opening configured to restrict passage of a fish therethrough based on the size of the fish. This may, for example, be in the form of a grid or frame of rigid bars with a pre-defined openings to allow smaller fish to pass through and exit via e.g. the second outlet 5b while retaining larger fish and leading these to outlet 5a.

Fish from the first outlet 5a can for example be moved to the third tank 3 and fish from the second outlet 5b can for example be moved to the second tank 2. Optionally, fish from the first outlet 5a can, for example, be provided for further transport elsewhere, such as to an offshore marine pen.

The processing unit 5 may comprise a drain 27 for draining water from the fish-and-water stream provided to the processing unit 5 from the conveyance pipe 22. Drained water 6 from the processing unit 5 can, optionally, be provided to the water inflow 8 in order to recirculate water. This can provide an advantage that a low water lifting height may be required for providing water to the inflow 8, if arranging the processing unit 5 at an elevation just below the outlet elevation 25.

By controlling the water inflow 8, the tank level 9 in tank 1 can be maintained substantially stable, thereby providing stable operating conditions. The flow rate through the conveyance pipe 22 can be adjusted by varying the height difference 7, if required. This provides operational flexibility and possibility to choose operating conditions most advantageous for the given operational scenario, e.g. the desired flow rate to provide gentle handling of the fish.

Advantageously, according to embodiments herein, the overall water volume in tank 1 can be maintained high, thus avoiding reductions in for example oxygen levels or otherwise deterioration of water quality when compared to alternative methods of draining the tank to obtain sufficient fish density to move fish out of the tank. Applying the method for sorting fish, such as illustrated in FIG. 1, the water levels 10,11 in the second and third tanks 2,3 may also be maintained at a lower level (such as half-full) during the sorting process without risking deteriorating oxygen levels, and thereafter the water levels 10,11 may be increase, if required or desirable.

The use of pumps in direct engagement with the fish can be avoided, and in some embodiments, a required lifting height of the fish can be reduced, thereby creating less stress and more gentle handling of the fish.

While fish has been used as an example here, the description above may apply equally to other forms of aquatic animals.

The invention is not limited by the embodiments described above; reference should be had to the appended claims.

The invention claimed is:

1. A method of moving farmed aquatic animals from a tank containing the animals, the tank having a tank outlet and a conveyance pipe, the conveyance pipe having a conveyance pipe inlet connected to the tank outlet and a conveyance pipe outlet at an outlet elevation higher than the tank outlet, the method comprising:
by means of a pumpless water inflow from a natural water supply into the tank, maintaining a water level in the tank such that the water level is at least a minimum height difference above the outlet elevation to generate a flow of water from the tank through the conveyance pipe while positioning a moveable water-permeable screen inside the tank to crowd the animals towards the tank outlet;
by means of the flow of water therethrough, moving animals through the conveyance pipe to a transport pipe connected to the conveyance pipe, the transport pipe comprising a processing unit;
moving the animals via the processing unit, wherein the processing unit comprises a drain;
draining, via the drain, water from the processing unit via which the animals are moved; and
by means of the pumpless water inflow from the natural water supply into the tank, varying, above the minimum height difference, the water level to vary a rate of the flow of water from the tank through the conveyance pipe.

2. The method of claim 1,
wherein the tank is a first tank and the water level is a first water level,
the method further comprising moving at least a proportion of the animals to a second tank via the transport pipe while maintaining a second water level in the second tank at a level lower than the outlet elevation of the conveyance pipe.

3. The method of claim 2, comprising:
moving at least a proportion of the animals to a third tank via the transport pipe while maintaining a third water level in the third tank at a level lower than the outlet elevation.

4. The method of claim 1, wherein the processing unit comprises a size-sorting unit.

5. The method of claim 4, wherein the size-sorting unit comprises a first and a second outlet for animals, access to one of the first and second outlets being via an opening configured to restrict passage of an animal therethrough based on a size of the animal.

6. The method of claim 5, comprising moving an animal from the first outlet to a third tank and moving an animal from the second outlet to a second tank.

7. The method of claim 1, wherein the tank outlet is arranged at a lower part of the tank.

8. The method of claim 1, wherein positioning the moveable water-permeable screen comprises moving the moveable water-permeable screen towards the tank outlet:
  in a plurality of steps, or
  continuously.

9. The method of claim 1, wherein the processing unit is arranged lower than the water level.

10. The method of claim 1, wherein the conveyance pipe outlet or the transport pipe comprises an air vent.

* * * * *